United States Patent
Blackmore et al.

(10) Patent No.: US 7,493,436 B2
(45) Date of Patent: Feb. 17, 2009

(54) INTERRUPT HANDLING USING SIMULTANEOUS MULTI-THREADING

(75) Inventors: Robert S. Blackmore, Poughkeepsie, NY (US); Rama K. Govindaraju, Hopewell Junction, NY (US); Peter H. Hochschild, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 11/553,229

(22) Filed: Oct. 26, 2006

(65) Prior Publication Data

US 2008/0104296 A1     May 1, 2008

(51) Int. Cl.
    *G06F 9/48* (2006.01)
(52) U.S. Cl. ..................................... 710/260
(58) Field of Classification Search ............... 710/260, 710/262, 263, 266, 268, 269
    See application file for complete search history.

(56) References Cited

U.S. PATENT DOCUMENTS

| 4,959,781 | A  * | 9/1990  | Rubinstein et al. ......... 710/262 |
| 6,061,710 | A  * | 5/2000  | Eickemeyer et al. ....... 718/107 |
| 6,640,299 | B1   | 10/2003 | Mang et al. |
| 6,779,065 | B2 * | 8/2004  | Murty et al. .............. 710/260 |
| 7,219,241 | B2 * | 5/2007  | Cooper et al. ............. 713/310 |
| 7,222,203 | B2 * | 5/2007  | Madukkarumukumana et al. ......... 710/260 |
| 7,316,021 | B2 * | 1/2008  | Joy et al. ................. 718/108 |
| 2002/0002667 | A1 | 1/2002 | Kelsey et al. |
| 2002/0038416 | A1 | 3/2002 | Fotland et al. |
| 2003/0046464 | A1 * | 3/2003 | Murty et al. ............. 710/260 |
| 2004/0205272 | A1 * | 10/2004 | Armstrong et al. ........ 710/260 |
| 2004/0215860 | A1 * | 10/2004 | Armstrong et al. ........ 710/260 |
| 2006/0031603 | A1 | 2/2006 | Bradfield et al. |
| 2006/0048116 | A1 | 3/2006 | Inglis et al. |
| 2006/0056405 | A1 | 3/2006 | Chang et al. |

OTHER PUBLICATIONS

Definition of Hyperthreading from Wikipedia, undated.*
Hyper-Threading Technology Architecture and Microarchitecture, Intel Technology Journal Q1, 2002.*
Operating System Support For Simultaneousl Multithreaded Processors, Bulpin, Feb. 2005.*

* cited by examiner

*Primary Examiner*—Khanh Dang
(74) *Attorney, Agent, or Firm*—John E. Campbell; Stephen Bongini; Fleit Gibbons Gutman Bongini & Bianco P.L.

(57) ABSTRACT

Disclosed are a method, information processing system, and computer readable medium for managing interrupts. The method includes placing at least one physical processor of an information processing system in a simultaneous multi-threading mode. At least a first logical processor and a second logical processor associated with the at least one physical processor are partitioned. The first logical processor is assigned to manage interrupts and the second logical processor is assigned to dispatch runnable user threads.

5 Claims, 6 Drawing Sheets

INTERRUPT HANDLING USING SIMULTANEOUS MULTI-THREADING

STATEMENT REGARDING FEDERALLY SPONSORED RESEARCH OR DEVELOPMENT

This invention was made with Government support under Contract No. NBCH30390004 awarded by the U.S. Defense Advanced Research Projects Agency. The Government has certain rights in this invention.

FIELD OF THE INVENTION

The present invention generally relates to the field of data processing, and more particularly relates to interrupt handling on a multi-threading processing system.

BACKGROUND OF THE INVENTION

In current parallel computing systems, software and network interrupts incur high overhead. For example, packet arrival interrupts cause the network device to raise an interrupt, which is fielded by the operating system first level interrupt handler ("FLIH"). The FLIH then queries the device causing the interrupt. Based on the device that caused the interrupt, the appropriate device interrupt handler, e.g., a second level interrupt handler ("SLIH") is called and takes whatever action is appropriate. In the case of a network interrupt, this action may include determining which user thread the packet arrival interrupt is associated with and making that user thread runnable so it may absorb the incoming packet into the ongoing computation. The overhead of going through these various steps and associated content switches is very high.

Another problem with current interrupt handling schemes involves interrupt targeting. The FLIH and SLIH run on whichever user thread that happens to be active at the time on the CPU which fields the interrupt. Since it is not clear to the dispatcher of the FLIH handler which process (running on some CPU) will eventually process and consume the incoming packet, the FLIH runs on some random CPU on the node, is funneled to CPU 0 every time, or the FLIH handling is rotated amongst the CPUs. Each of these selections has the effect of potentially disrupting one of the applications running on the CPU on which the FLIH is dispatched. Since parallel applications are typically well synchronized, this has an impact on the overall application performance.

One proposed solution to the above problems is to service multiple threads of execution in a single core. For example, various processing architectures support more than one thread of execution. Currently, multiple hardware threads are treated as a virtual CPU. In other words, a system with n physical CPUs appears to have m*n virtual CPUs, where m is the number of hardware threads. Each virtual CPU can concurrently execute an instruction stream.

However, for parallel systems this is not the most effective use of hardware threads. For example, the application must be split into a larger number of separate tasks to take full advantage of the CPU. Most parallel systems do not linearly scale. Therefore, the gain from instruction level overlap may be completely wiped out by inefficiencies in the parallelization of the problem. Also, parallel applications typically use a communication device, which may have to support a higher bandwidth to support more tasks. Additionally, large scale parallel applications are typically written with synchronization and load balancing in mind and become more sensitive to scheduling of other work on the CPUs.

SUMMARY OF THE INVENTION

Briefly, in accordance with embodiments of the present invention, disclosed are a method, information processing system and computer readable medium for managing interrupts. The method includes placing at least one physical processor of an information processing system in a simultaneous multi-threading mode. At least a first logical processor and a second logical processor associated with the at least one physical processor are partitioned. The first logical processor is assigned to manage interrupts and the second logical processor is assigned to dispatch runnable user threads.

In another embodiment an information processing system for managing interrupts is disclosed. The information processing system includes a memory and a processor that is communicatively coupled to the memory. A simultaneous multi-threading interrupt managing module is communicatively coupled to the memory and the processor. The simultaneous multi-threading interrupt managing module is for placing at least one physical processor of an information processing system in a simultaneous multi-threading mode. At least a first logical processor and a second logical processor associated with the at least one physical processor are partitioned. The first logical processor is assigned to manage interrupts and the second logical processor is assigned to dispatch runnable user threads.

In yet another embodiment a method for using simultaneous multi-threading threads to support pseudo remote direct access memory on an information processing system is disclosed. The method includes placing at least one physical processor of the information processing system in a simultaneous multi-threading mode. At least a first logical processor and a second logical processor associated with the at least one processor are partitioned. The first logical processor is assigned to manage interrupts by placing the first logical processor in a dormant state. The dormant state allows the first logical processor to respond to external interrupts. The second logical processor is assigned to dispatch runnable user thread. A user space buffer is assigned as a target of a remote direct memory access operation and an external interrupt is received. The first logical processor is transitioned from the dormant to an active state when the external interrupt is received.

The first logical processor calls an interrupt handler for handling the external interrupt. In response to the calling, the method determines if data is available in a communication buffer that is intended for the user space buffer. If data is available, addressability to the communication buffer and the user space buffer is gained. The data is directly copied from one of the communication buffer to the user space buffer and the user space buffer to the communication buffer. A user state is updated to indicate data has moved.

In another embodiment, a computer readable medium for managing interrupts is disclosed. The computer readable medium comprises instructions for placing at least one physical processor of an information processing system in a simultaneous multi-threading mode. At least a first logical processor and a second logical processor associated with the at least one physical processor are partitioned. The first logical processor is assigned to manage interrupts and the second logical processor is assigned to dispatch runnable user threads.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

Exemplary Parallel-Distributed Processing System

Figure 1:
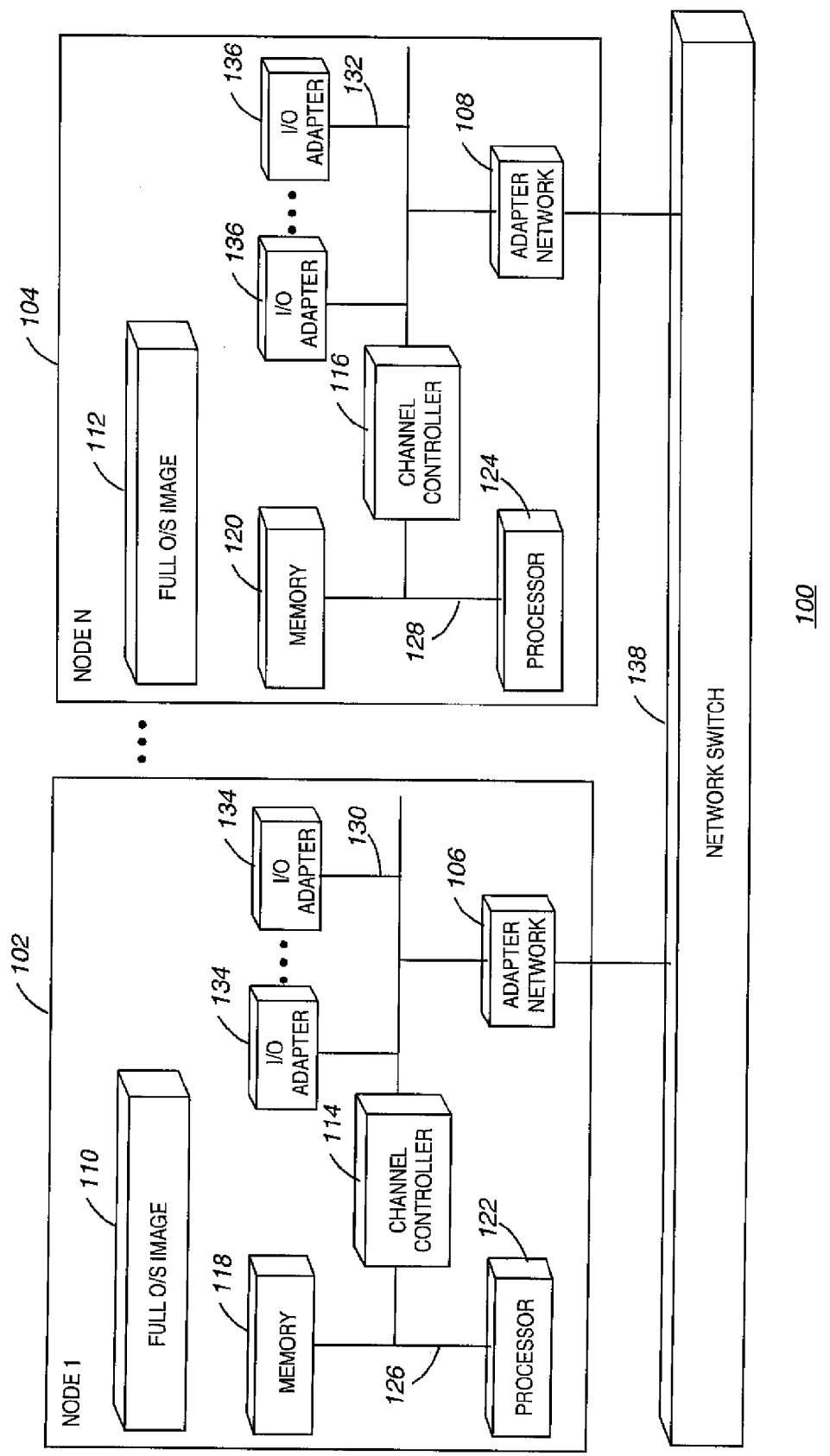
FIG. 1 is a block diagram illustrating a parallel distributed processing system according to one embodiment of the present invention.

FIG. 1 shows a parallel-distributed processing system 100 in which embodiments of the present invention may be implemented. In this embodiment, the parallel-distributed processing system 100 operates in an SMP computing environment. In an SMP computing environment, parallel applications can have several tasks (processes) that execute on the various processors on the same processing node. The parallel-distributed processing system 100 executes on a plurality of processing nodes 102 and 104 coupled to one another node via a plurality of network adapters 106 and 108. Each processing node 102 and 104 is an independent computer with its own operating system image 110 and 112, channel controller 114 and 116, memory 118 and 120, and processor(s) 122 and 124 on a system memory bus 126 and 128, a system input/output bus 130 and 132 couples I/O adapters 134 and 136 and communication adapter 106, 108. Although only one processor 122 and 124 is shown in each processing node 102 and 104, each processing node 102 and 104 are capable of having more than one processor. Each communication adapter is linked together via a network switch 138. In some embodiments, the various processing nodes 102 and 104 are able to be part of a processing cluster. All of these variations are considered embodiments of the present invention.

Exemplary Information Processing System

Figure 2:
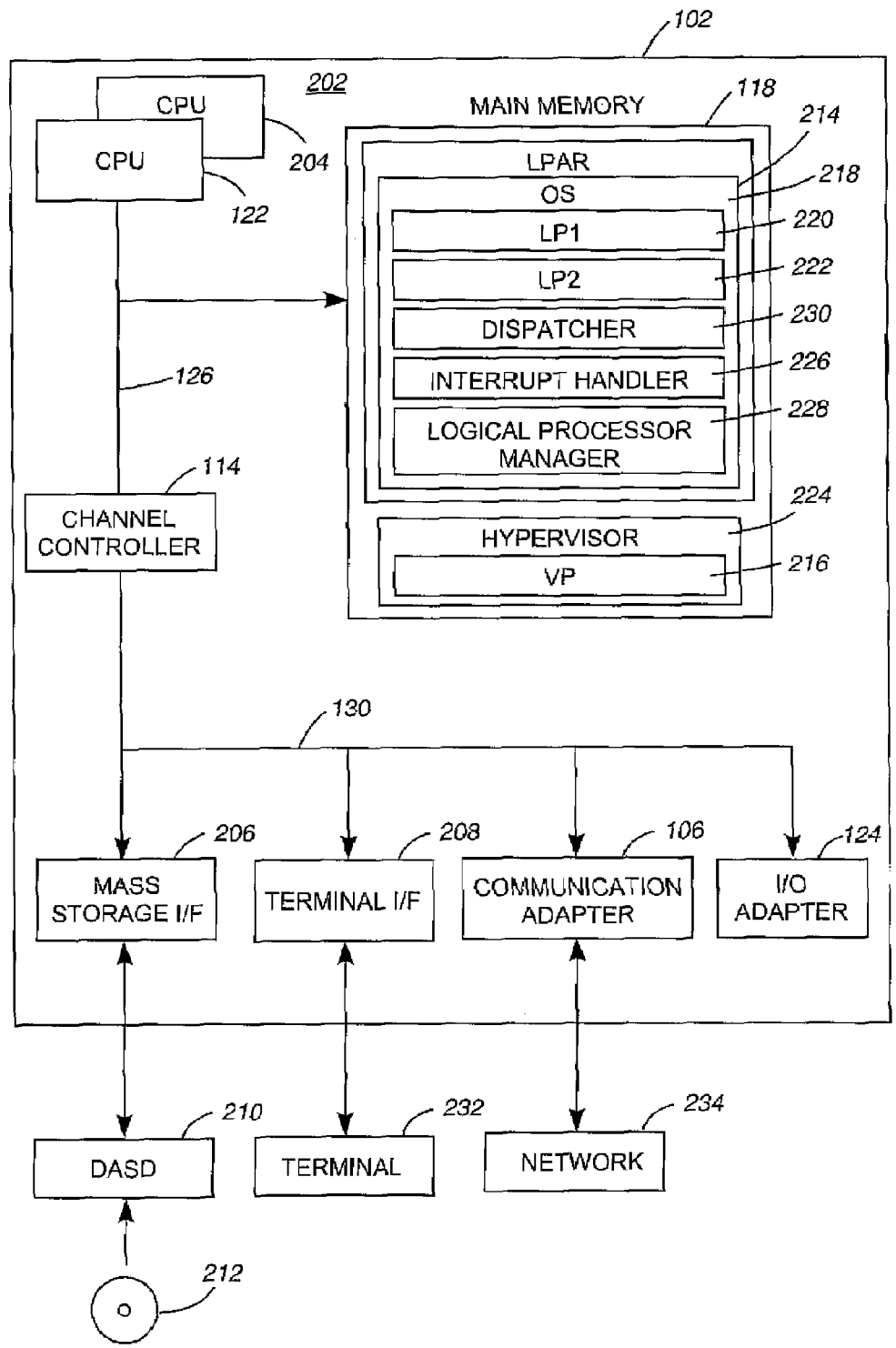
FIG. 2 is a detailed view of an information processing system according to one embodiment of the present invention.

FIG. 2 is a block diagram illustrating a detailed view of the information processing system 102 of FIG. 1. In the exemplary embodiment, the information processing system 102 is a parallel processing system that allows parallel applications having several tasks (processes) to execute on the various processors of the information processing system 102. Any suitably configured processing system is similarly able to be used as the information processing system 102 in further embodiments of the present invention (for example, a personal computer, workstation, or the like). The information processing system 102 includes a computer 202.

The computer 202 includes several physical processors 122 and 204 that are communicatively coupled to the main memory 118 and the channel controller 114 via the system bus 126. In this embodiment, the main memory 118 is volatile memory such as random access memory ("RAM"). The computer 202 also includes a mass storage interface 206, terminal interface 206, I/O adapter 124, and a communication adapter 106. An input/output bus 130 connects these components.

The mass storage interface 206 is used to connect mass storage devices such as data storage device 210 to the information processing system 102. One specific type of data storage device is a computer readable medium such as a Compact Disc ("CD") drive, which may be used to store data to and read data from a CD 212 or DVD. Another type of data storage device is a hard disk configured to support, for example, JFS type file system operations.

The main memory 118 comprises a logical partition ("LPAR") 214, a virtual processor ("VP") 216, an operating system ("OS") 218, a plurality of logical processors ("LP") 220 and 222, a hypervisor 224, an interrupt handler 226, a logical processor manager 228, and a dispatcher 230. In one example, one or more of these components are included within an SMT interrupt managing module 236 that handles interrupts using simultaneous multi-threading. The logical partition 214, in this embodiment, is a set of data structures and services that enables distribution of computer resources within a single computer to make the computer function as if it were two or more independent computers. Each logical partition is assigned all the resources it needs to operate as though it were an independent computer, including processor time, memory, an operating system, and the like.

The virtual processor 216, in this embodiment, is a subsystem comprising data structures and computer program instructions for implementing assignment of processor lime to a logical partition. A shared pool of physical processors 122 and 204 supports the assignment of partial physical processors (in time slices) to a logical partition. Such partial physical processors shared in time slices are referred to as "virtual processors". Physical processors held in a shared processing pool are shared among logical partitions. In the examples of this discussed below, physical processors are shared according to processing units with 1.0 processing units representing the processing capacity of one physical processor.

The operating system 218 is a layer of system software that schedules threads and provides functions for making system resources available to threads, including memory access, access to input/output resources, and the like. The operating system also controls allocation and authorization for access to computer resources. The operating system performs low-level basic tasks such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX™, Linux™, Microsoft NT™, AIX™, IBM's i5os, and many others.

A "thread" is a unit of software execution on a multiprocessing computer such as the information processing system 102. On such a computer, software programs are executed in units of execution called "processes" that include all the processor registers, code segment and offset registers, data segment and offset registers, stack segment and offset registers, flag registers, instruction pointer registers, program counters, and the like that are needed for execution of software programs. For efficiency, "processes" are often organized further into one or more threads, where each thread of a process individually possesses all the attributes needed for execution, except that a thread shares memory among all the other threads of a process, thereby reducing the overhead of operating system switches from thread to thread ("context switches").

In this embodiment, the physical processors 122 and 204 of the information processing system 102 are capable of running in a single-thread ("ST") mode where each virtual processor 216 has one logical processor 220. ST multi-threading is time-multiplexed multi-threading, that is, multi-threading by use of time slices or time quanta. In an ST mode, both individual threads and virtual processors are assigned to a portion of a processor's computing capacity apportioned in segments of time, each of which is referred to as a "time slice" or "time quantum". The physical processors 122 and 204 of the information processing system 102 may also be capable of running in a simultaneous multi-threading ("SMT") mode. In an SMT mode each virtual processor 216 has two or more logical processors 220 and 222 and instructions from more than one thread can be accepted simultaneously. In particular, SMT allows the processor hardware on a chip to be shared among multiple threads of a multi-threaded workload. SMT is a technique that lets multiple independent threads issue instructions to a single physical processor in a single processing cycle. An example of a processor that implements SMT as discussed herein is IBM's Power5™ processor.

In one embodiment, SMT is implemented on the physical processors 122 and 204, each of which is capable of accepting instructions from more than one thread of execution simultaneously. Also in SMT mode, both virtual processors 216 and threads running on virtual processors 216 may be apportioned through time slices. A thread of execution on a virtual processor in SMT mode may be viewed as running on a logical processor 220 or 222. A virtual processor 216 running on a physical processor in SMT mode therefore may be viewed as supporting more than one logical processor.

A ready queue includes all the threads of the system that are in the "ready" state, waiting in priority order for dispatching to a processor 122 and 204. Threads are placed in the ready queue when they are first created. When dispatched to a processor 122, 204, each thread is typically authorized to occupy the processor 122 and 204 for no more than a maximum amount of time, referred to as a "time slice", after which the thread is "preempted" for return to the ready queue until other threads have a chance to run on the processor 122 and 204. Threads are typically placed on the ready queue when they are preempted while running on a processor 122 and 204; that is, when a higher priority thread arrives in the ready queue or when a thread's time slice expires.

Threads that are in the "wait" state are maintained in a wait queue (not shown). Threads in the wait state are often waiting for input/output returns from peripheral devices such as user input devices, display devices, communications adapters, memory, and others. Threads running on a processor are moved to the wait queue and to the "wait" state when they issue system calls. Such system calls are often requests for data input from or output to peripheral devices.

The logical processor 220 or 222, in this embodiment, is an operating system's structure for scheduling threads for execution. That is, rather than scheduling threads for execution on a physical processor or a virtual processor, the operating system 218 schedules threads for execution on a logical processor 220 and 222. Scheduling a thread on a logical processor 220 and 222 provides convenient structure and processing in which the thread appears, from the point of view of the thread, to have at its disposal all the resources of an entire LPAR 214. Virtual processors 216, in this embodiment, are apportioned fractions of a physical processor 122 or 204.

A logical processor 220 or 222, however, is logically an entire processor (despite the fact that it is only active for a portion of the CPU cycles available on the physical processor 122 or 204). A thread running on a logical processor 220 or 222 in an LPAR 214 appears, therefore, from its point of view, to have all the resources of an entire independent computer. That is, the logical processor 220 or 222 is the object upon which the dispatcher 230 in the operating system 218 runs user threads (looking from the operating system down), and a virtual processor is what is dispatched by the hypervisor 224. In an LPAR 214 operating in an ST mode, the correspondence between logical processors 220 and 222 and virtual processors 216 is one-to-one, i.e., one logical processor 220 for each virtual processor 216. In an LPAR 214 operating in an SMT mode, the correspondence between logical processors 220 and 222 and virtual processors 216 is N-to-one, where N is the number of logical processors 220 and 222 supported on a virtual processor 216, i.e., N logical processors for each virtual processor 216.

The hypervisor 224 of FIG. 2 is a layer of system software that runs under the operating system in logical partitions. That is, a hypervisor 224 runs between an operating system 214 and underlying physical computer components including physical processors 122 and 204. It is the function of the hypervisor 224, among other things, to schedule virtual processors 216 on physical processors 122, 204. Also stored in the main memory 118 and included in the OS 218 are the dispatcher 230 and the interrupt handler 226.

An "interrupt" is a mechanism by which a computer subsystem or module external to a processor may interrupt the otherwise normal flow of operations on the processor. In particular, in interrupt-drive input/output processing, interrupts are provided so that a thread sending or receiving data to or from a peripheral device need not block and wait. Instead, the thread issues a system call and suspends operation while waiting in the wait queue for its data. When the peripheral device has the data ready, the peripheral device triggers an interrupt by signaling the processor, usually by way of a system bus. The processor "catches" the interrupt, saves the running thread's operating context, and then hands control over to an interrupt handler that "clears" the interrupt by processing it. The interrupted thread's saved operating context is at minimum all information needed to resume thread processing at the point at which it was interrupted, that is, at least the processor status registers and the location of the next instruction to be executed in the interrupted thread, in addition to whatever other information is needed by the particular operating system.

The interrupt handler 226 is a software function in the OS 218 that processes interrupts. Although FIG. 2 shows only one interrupt handler 226, modern interrupt handlers are typically split into two parts, a first level interrupt handler ("FLIH") and a second level interrupt handler ("SLIH"). The FLIH discovers the cause of the interrupt, but typically does not process the interrupt. For example, when the hardware raises an exception, the FLIH is the first code that is run to determine what caused the exception. This code always runs in the interrupt context, meaning that the CPU is temporarily stopped from executing other code and saves a minimal amount of state to start dealing with whatever caused the exception.

Once the FLIH determines the cause of the interrupt, it typically calls the SLIH to process the interrupt. The second level interrupt handler is often associated with the particular device which generated the interrupt. The SLIH also runs in the interrupt context. After being called by the FLIH, the SLIH processes the interrupt in the interrupt context. In the case where a user thread is waiting for data made available by the interrupt, the SLIH marks that thread as runnable and returns. The user thread then runs when a CPU time slice becomes available.

In an embodiment a fast-path interrupt handler is included in the OS 218. The fast-path interrupt handler, in one embodiment, combines functions of the FLIH and SLIH and immediately starts executing user space code that was waiting for (or blocked on) the interrupt when it determines that the CPU is in a dormant state. In the example discussed below, the interrupt handler 226 is a fast-path interrupt handler.

The logical processor manager 228, in this embodiment, manages each of the logical processors 220 and 222 associated with a physical processor 122 and 204. In one embodiment, the logical processor manager 228 assigns one of the logical processors 220 and 222 to handle interrupts. In other words, instead of using all of the logical processors 220 and 222 to dispatch runnable user threads, at least one of the logical processors 220 and 222 is used as a low latency path to handle hardware interrupts by a user level thread. This is very useful when using communication protocols that rely on interrupt notification for data arrival. Assigning at least one of the logical processors 220, 222 to handle interrupts also eliminates the need for the associated context switching for a user thread when an interrupt occurs.

In some embodiments, the logical processor manager 228 utilizes one or more of the logical processors 220 and 222 as a mechanism to implement a pseudo remote direct memory access ("RDMA") engine. For example, some communication adapters are designed to support RDMA. However, large subsets of communication adapters do not have facilities to support RDMA. Therefore, some embodiments of the present invention use one or more SMT threads (logical processors 220 and 222) for use as a pseudo RMDA engine. In such embodiments, a dormant logical processor 220 or 222 (i.e., one not using any hardware resources) put into an active state (or is woken) by the interrupt and begins executing the fast-path interrupt handler.

In this fast path interrupt handler, the activated logical CPU copies the data from a communication buffer into a user buffer (or from a user buffer to a communication buffer) and returns to the dormant state once the copy has finished. In another embodiment, the logical processor 220 and 222, at a lower hardware priority (that is allowing the polling logical CPU to use only a very small portion of the cycles available on the physical CPU), can intelligently poll the network for data. Once the logical processor 220, 222 is active, it can copy data from a kernel buffer to a user space buffer prior to signaling to the user application that there is data available.

In the pseudo remote direct memory access ("RDMA") engine example above, at least one user runnable thread is set to a low priority state. The at least one user runnable thread receives $1/(2^n)$ of available processor cycles. The integer $n=(1+|p1-p2|)$, wherein p1 is a hardware thread priority of a first logical processor (SMT thread) and p2 is a hardware thread priority of the second logical processor (SMT thread). Network interrupts are disabled and the at least one user runnable thread is assigned to query a network for packet arrival.

Figure 3:
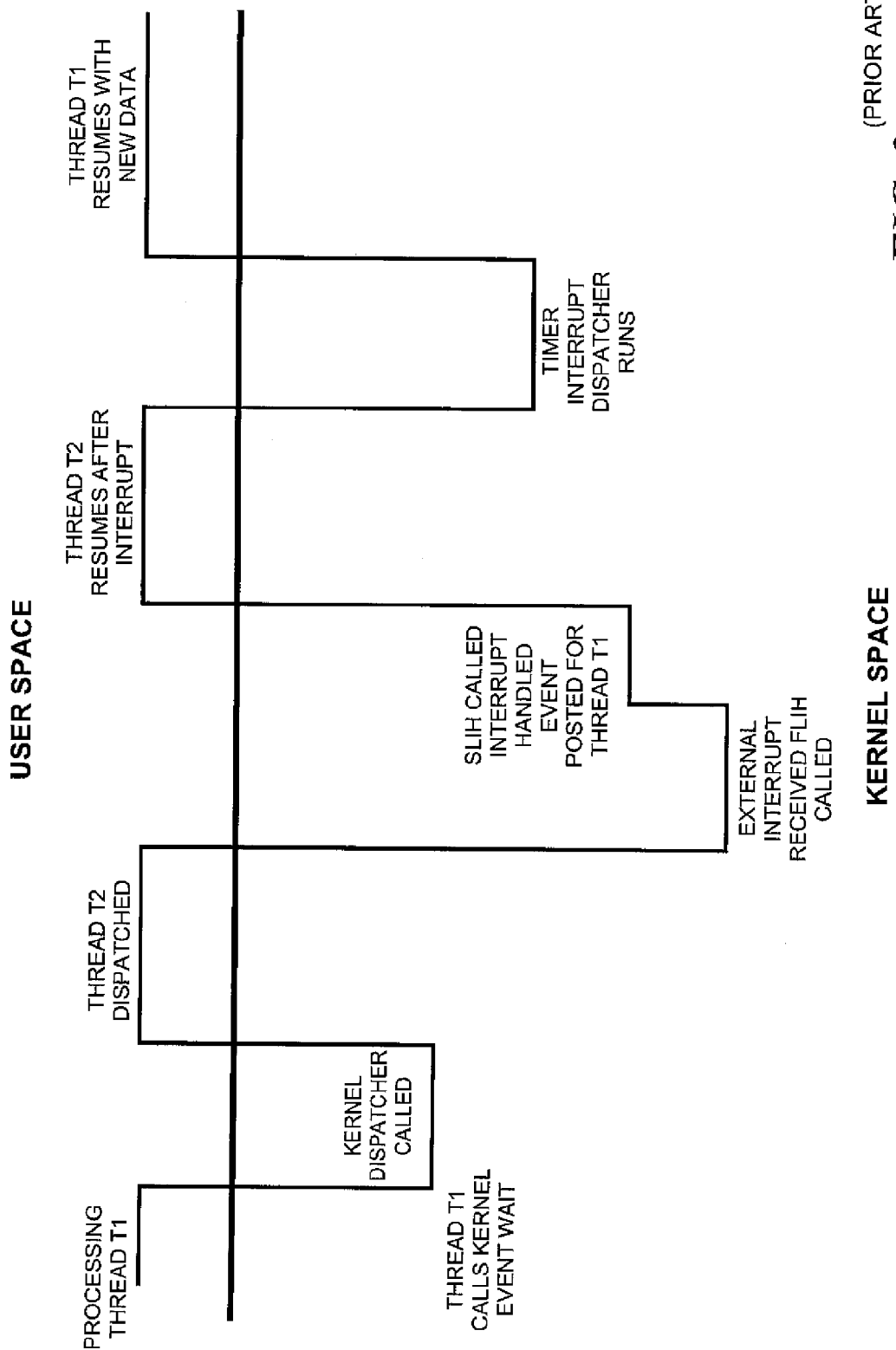
FIG. 3 is a processing flow diagram illustrating conventional handling of interrupts.

In conventional systems, if a CPU is processing data and an interrupt is received, the CPU is stopped and begins processing the interrupt that came in. If a user space thread is waiting for an external adapter and is not polling for data arrival, the thread can be put to sleep and woken up after the interrupt is handled, as shown by the processing flow in FIG. 3. In this example, thread T1 is processing an instruction stream, at some point in time represented by the first vertical bar, T1 needs data from the network and calls into the kernel to wait for that data. Since the data is not available, the kernel dispatcher is called and another unrelated thread, T2, of a possibly different process begins executing. At some point, represented by the third vertical bar the network interrupts the processors and the FLIH and SLIH are called, the latter of which marks the thread T1 as ready to run. When the time slice for T2 completes, thread T1 begins to execute again. However, there is a high latency experienced with the process of receiving an interrupt, handling the interrupt, notifying the associated CPU and so on. One of the advantages of the present invention is that because one of the logical processors 220 and 222 is kept dormant to handle system interrupts so that the other logical processors, either 222 or 220 can run without interruption. This allows for interrupts to be handled very quickly and in an efficient manner. For example, the interrupt can travel directly from the kernel up into the user space instead of having to wait for a logical processor 220 or 222 to be interrupted so that the process associated with the interrupt can be executed.

When there is only a single executable stream on a processor, this high latency path must be taken because, if the CPU is used at all, it must be running in some user or interrupt context and after last interrupt is handled, the previous context must be resumed. This resumption is required because there is a limit to the depth of the interrupt stack, and that depth may be exceeded if a thread running in an interrupt context could always call user level code at base process priority. The physical processors 122 and 204, in one embodiment, can be switched from an ST mode to an SMT mode by having a live thread issue a control instruction to start the SMT thread. In another embodiment, an internal decrementor interrupt and/or an external interrupt are included in the physical processors 122 and 204 and are enabled on the dormant thread. In one embodiment, the dormant thread is woken by an external interrupt only and the live thread is disabled for external interrupts but is enabled for internal decrementor interrupts. This allows the system to operate in ST mode as long as no interrupt is received. When an external interrupt is received, the CPU goes into SMT mode and the newly woken thread will begin executing the fast path interrupt handing code.

The hypervisor 224, virtual processor 216, logical partition 214, operating system 218, logical processors 220, 222, dispatcher 230, interrupt handler 22, and logical processor manager 228 in the example of FIG. 2 are shown in the main memory 118 (e.g., RAM). However, in further embodiment, many components of such software may be stored in non-volatile memory such as the DASD 210, electrically erasable programmable read-only memory space ("EEPROM" or "Flash memory"), RAM drives, and the like.

Terminal interface 208 is used to directly connect one or more terminals 232 to computer 202 to provide a user interface to the computer 202. These terminals 232, which are able to be non-intelligent or fully programmable workstations, are used to allow system administrators and users to communicate with the information processing system 102. The terminal 232 is also able to include user interface and peripheral devices that are connected to computer 202 and controlled by terminal interface hardware included in the terminal I/F 208 that includes video adapters and interfaces for keyboards, pointing devices, and the like.

The communications adapter 124 provides an interface to the network 234 for implementing data communications with other computers. Such data communications may be carried out, for example, through data communications networks such as IP networks or in any other way. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11 adapters for wireless network communications. Embodiments of the present invention are able to be adapted to work with any data communications connections including present day analog and/or digital techniques or via a future networking mechanism.

Although the exemplary embodiments of the present invention are described in the context of a fully functional computer system, embodiments are capable of being distributed as a program product via a CD 210 and its equivalents, floppy disk, or other form of recordable media, or via any type of electronic transmission mechanism.

Exemplary Processing Flow For Handling Interrupts With A Logical Processor

Figure 4:
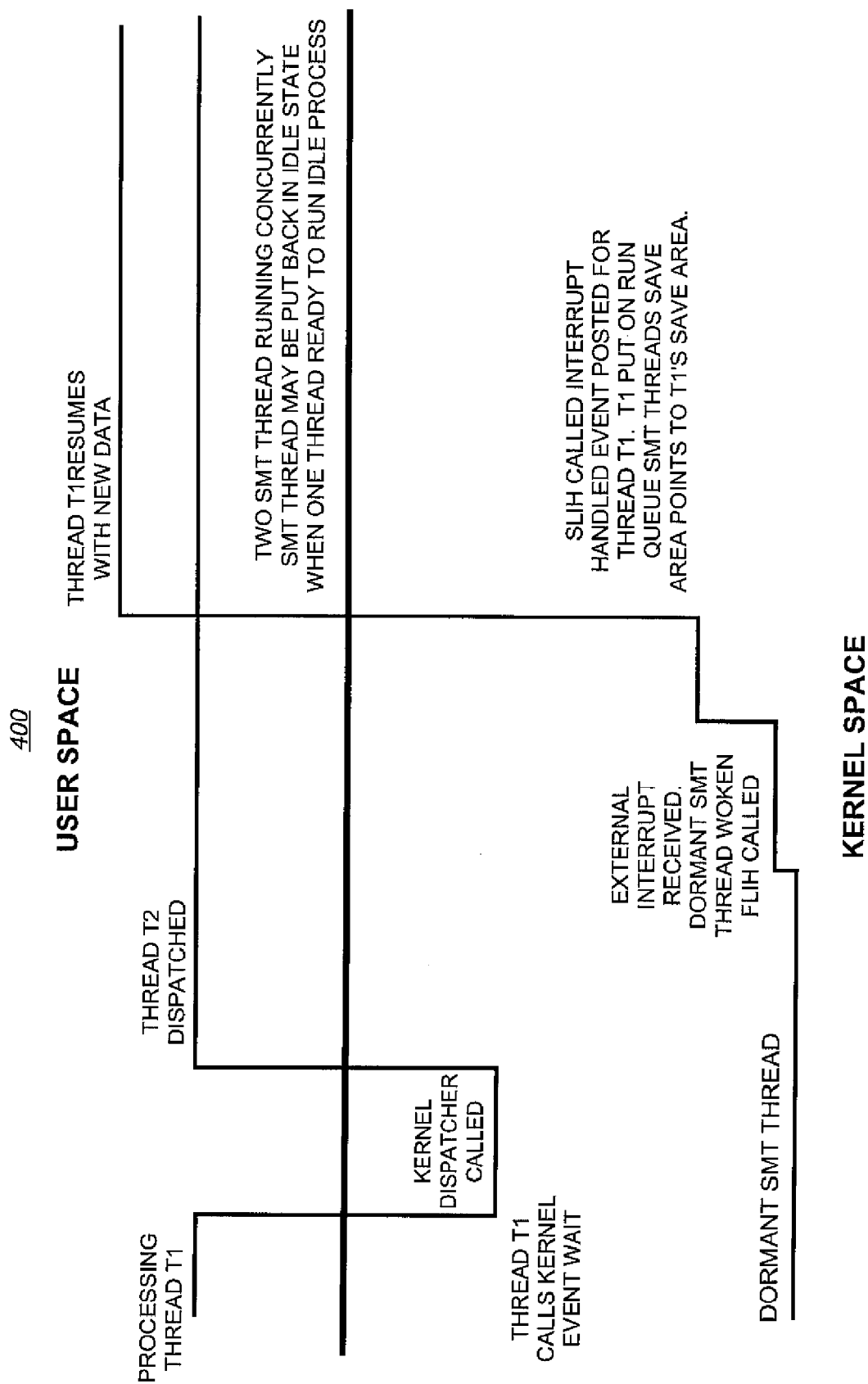
FIG. 4 is an operational flow diagram illustrating a process of handling interrupts using SMT threads according to an exemplary embodiment of the present invention.

FIG. 4 shows a processing diagram 400 illustrating the processing flow executed by the fast-path interrupt handler 226 according to one embodiment of the present invention. As discussed above, the physical processors 220 and 222 of the information processing system 102 can run in an SMT mode. The logical processor manager 228 places at least one SMT thread (logical processor 220 or 222) into a dormant state. In other words, the dormant SMT thread is not using any hardware resources, but is defined by the OS 218 and enabled to handle interrupts. A user thread blocks on data arrival (e.g., is placed in a waiting queue waiting for an event such as the arrival of data from a high speed communication adapter). The OS 218 places the user thread in the blocked state and the kernel dispatcher 230 is initialized.

If other runnable threads exist, the dispatcher 230 resumes one of these threads with the logical processor that had been running the thread that was blocked on data arrival. At some point in time, an external interrupt arrives and the dormant SMT thread is woken and begins execution. In one embodiment, the live thread will not be interrupted since the external interrupts are enabled only on the dormant thread. In the case of two a physical CPU that supports two SMP threads, prior to the interrupt the system is essentially running in ST mode and afterwards in SMP mode.

When the dormant SMT thread is woken by the interrupt, the user thread that is dispatched first starts executing at the location specified in the system reset vector. Here, the logical processor 220 and 222 is initialized and if it is a dormant SMT thread, it records its state as initializing. The first and second level interrupt handlers, which in this embodiment are included in the fast-path interrupt handler 226 are called. If there is a blocked thread waiting for the data and its state is initialized, the logical processor 220 or 222 which corresponds to the newly woken SMT thread sets its machine state save area to that of the blocked user thread. This logical processor then removes the user thread from the blocked thread queue, places it on the running queue, sets the interrupt priority to the base run priority, and begins executing the user code. The logical processor 220 or 222 then posts the thread event. If an active logical processor 222 or 222 is interrupted, the first and second level interrupt handlers (in the fast-path interrupt handler 226) are called. The user thread is posted and the blocked user thread is made runnable. After the user processing has completed, the woken SMT thread may return to a dormant state.

In another embodiment, the program flow of FIG. 4 discussed above is modified to handle the pseudo-RDMA embodiment. For example, instead of setting the interrupt return state to that of a blocked thread, an interrupt can be scheduled at a lower priority than a page fault. The data can then be copied from the communication buffers in the fast-path interrupt handler 226. Because the interrupt is running at a lower priority than the page fault interrupt, the user data does not need to be pinned.

Exemplary Process For Handling Interrupts Using SMT Threads

Figure 5:
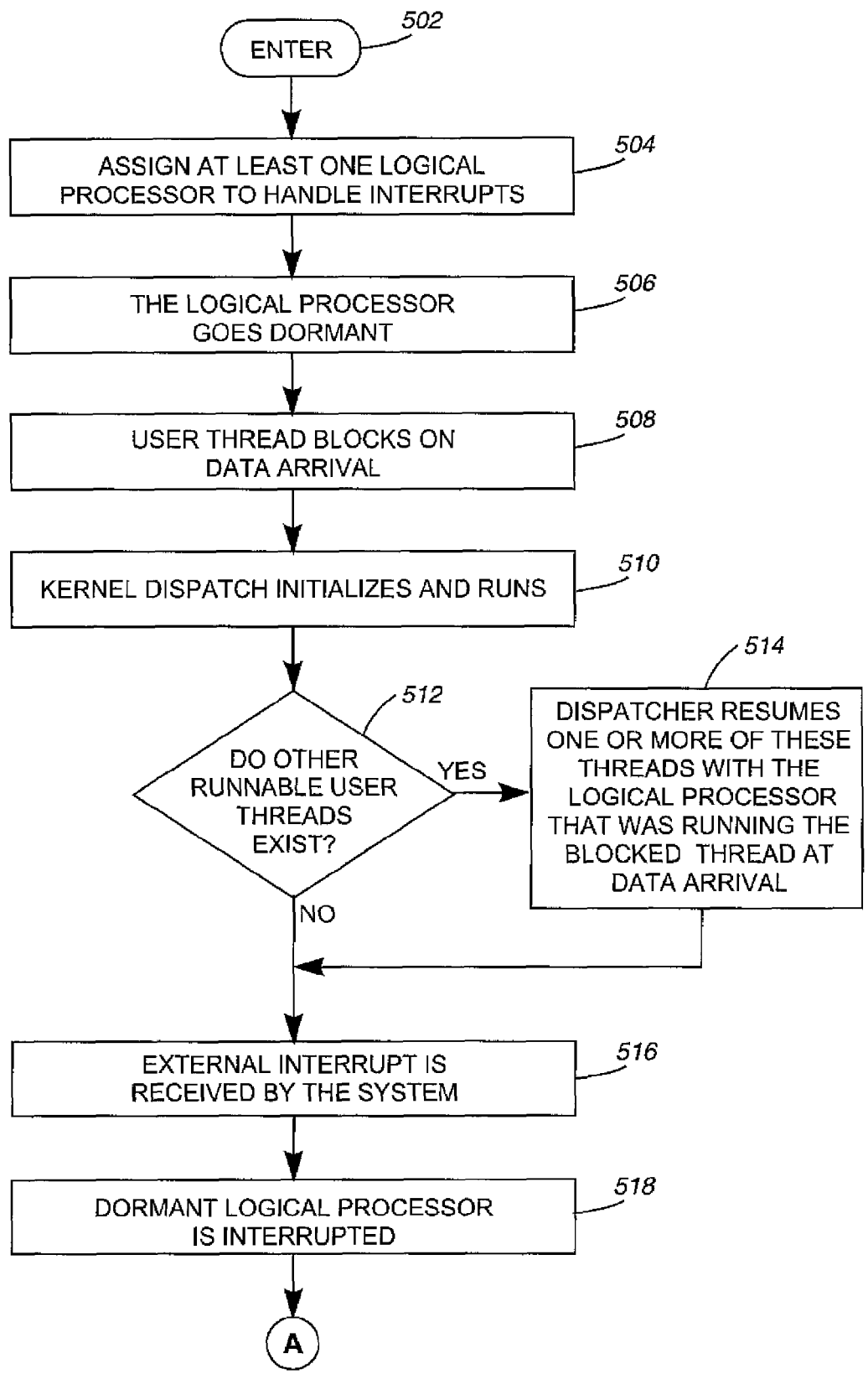
FIGS. 5 and 6 illustrate an operational flow diagram illustrating a process of handling system interrupts using SMT threads according to one embodiment of the present invention.
Figure 6:
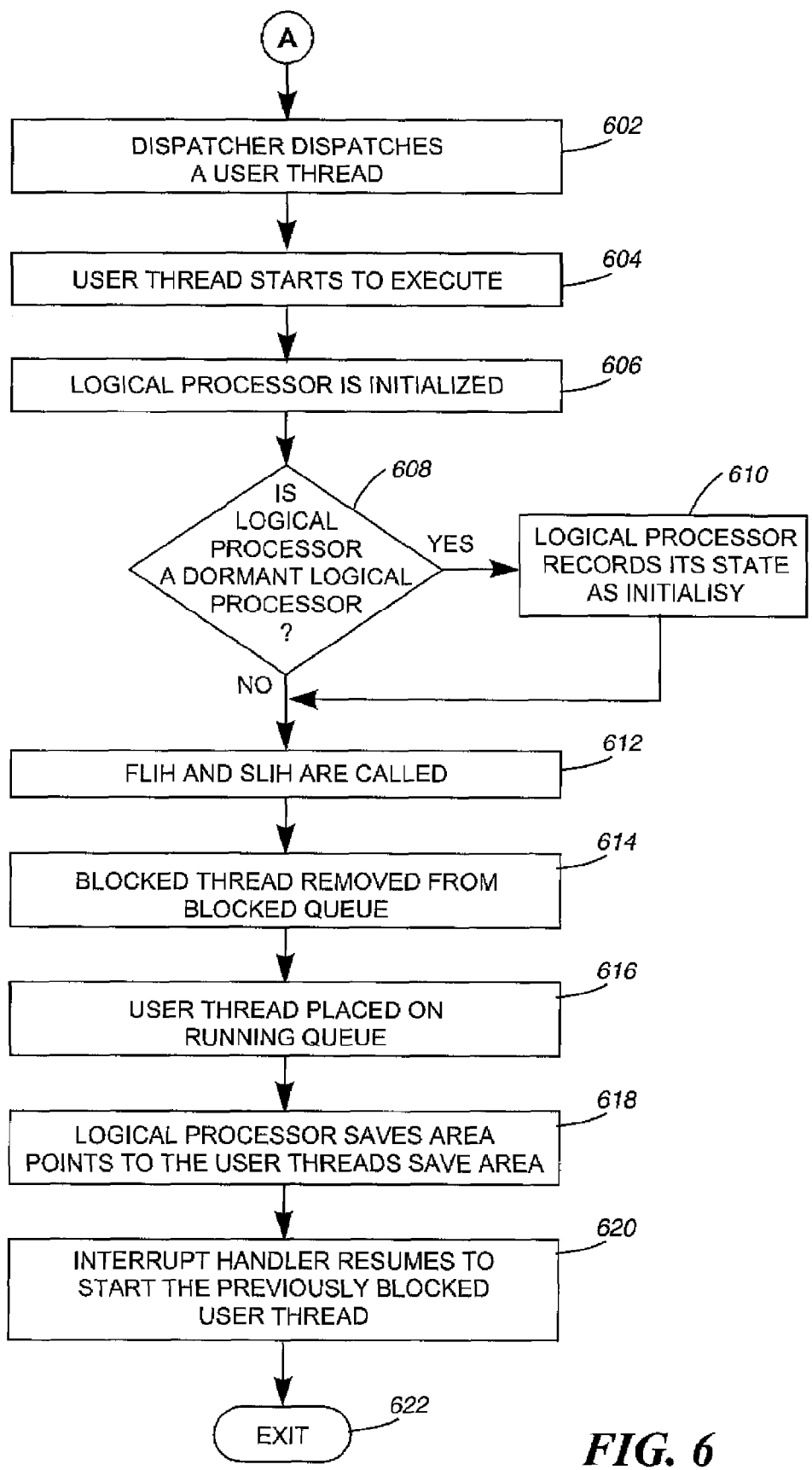

FIGS. 5 and 6 illustrate an exemplary process of handling interrupts using at least one SMT thread according to one embodiment of the present invention. The operational flow diagram of FIG. 5 begins at step 502 and flows directly to step 504. One or more logical processors (SMT threads), at step 504, are assigned to handle system interrupts. The logical processor, at step 506, becomes dormant. A user thread, running on a different logical CPU at step 508, blocks waiting for data arrival.

The kernel dispatcher, at step 510, initializes and begins to run. The dispatcher, at step 512, determines if any other runnable user threads exists. If the result of this determination is positive, the dispatcher, at step 514, resumes one or more of these user threads with the logical processor that was running the blocked user thread when the data arrived. The control then continues at step 516. If the result of this determination is negative, the control goes directly to step 516 and the system waits for an external interrupt, which is received, at step 516, by the system. The dormant logical processor, at step 518, is woken and the control flows to step 602, as shown in FIG. 6.

The dispatcher, at step 602, dispatches a user thread. The SMT thread corresponding to the previously dormant thread, at step 604, begins to execute at the location in the system reset vector. The logical processor used for executing the user thread is initialized at step 606. The logical processor manager, at step 608, determines if the logical processor used for executing the user thread was the dormant logical processor. If the result of this determination is positive, the logical processor records its state as not dormant in step 610. The control flow then continues at step 612. If the result of this determination is negative, then the thread takes the normal interrupt path.

The now active logical processor, at step 614, removes the blocked user thread from the blocked thread queue. The user thread, at step 616, is placed in the running queue and its thread event is posted. The logical processor, at step 618, saves its machine state save area to the user thread's save area. The fast-path interrupt handler, at step 620, resumes to start the previously blocked user thread. The control flow then exits at step 622.

In another embodiment, the above operational flow is modified to provide a pseudo-RDMA engine as discussed above. For example, instead of setting the interrupt return state to that of a blocked thread at step 618, an interrupt can be scheduled at a lower priority than a page fault. The data can then be copied from the communication buffers in the fast-path interrupt handler. Because the interrupt is running at a lower priority than the page fault interrupt, the user data does not need to be pinned.

NON-LIMITING EXAMPLES

The present invention can be produced in hardware or software, or in a combination of hardware and software. In one embodiment the present invention is implemented in software. The system, or method, according to the inventive principles as disclosed may be produced in a single computer system having separate elements or means for performing the individual functions or steps described or claimed or one or more elements or means combining the performance of any of the functions or steps disclosed or claimed, or may be arranged in a distributed computer system, interconnected by any suitable means.

According to the inventive principles as disclosed, the invention and the inventive principles are not limited to any particular kind of computer system but may be used with any general purpose computer arranged to perform the functions described and the method steps described. The operations of such a computer may be according to a computer program contained on a medium for use in the operation or control of the computer. The computer medium, which may be used to hold or contain the computer program product, may be a fixture of the computer such as an embedded memory or may be on a transportable medium such as a disk.

The present invention is not limited to any particular computer program or logic or language, or instruction but may be practiced with any such suitable program, logic or language, or instructions. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network that allows a computer to read such computer readable information.

Although specific embodiments of the invention have been disclosed, those having ordinary skill in the art will understand that changes can be made to the specific embodiments without departing from the spirit and scope of the invention. The scope of the present invention is not to be restricted, therefore, to the specific embodiments, and it is intended that the appended claims cover any and all such applications, modifications, and embodiments within the scope of the present invention.

What is claimed is:

1. A method for managing interrupts on an information processing system, the method comprising the steps of:
    placing at least one physical processor of the information processing system in a simultaneous multi-threading mode;
    partitioning at least a first logical processor and a second logical processor associated with the at least one physical processor;
    assigning the first logical processor to manage interrupts and the second logical processor to dispatch runnable user threads;
    receiving an external interrupt;
    changing a state of the first logical processor from a dormant state to an active state in response to an interrupt;
    calling, by the first logical processor, an interrupt handler for handling the external interrupt;
    determining, in response to the calling, if at least one blocked user thread exists in a waiting queue, wherein the at least one blocked user thread can become runnable as a result of the interrupt;
    if the at least one blocked user thread exists in the waiting queue, setting a machine state save area associated with the first logical processor to a save area associated with the at least one blocked user thread; and
    directly executing an instruction stream of the previously blocked user thread on the first logical processor.

2. A method for using simultaneous multi-threading threads to support pseudo remote direct access memory on an information processing system, the method comprising the steps of:
    placing at least one physical processor of the information processing system in a simultaneous multi-threading mode;
    partitioning at least a first logical processor and a second logical processor associated with the at least one processor;
    assigning the first logical processor to manage interrupts by placing the first logical processor in a dormant state, wherein the dormant state allows the first logical processor to respond to external interrupts;
    assigning the second logical processor to dispatch runnable user threads;
    assigning a user space buffer as a target of a remote direct memory access operation;
    receiving an external interrupt;
    transitioning the first logical processor from the dormant to an active state when the external interrupt is received;
    calling, by the first logical processor, an interrupt handler for handling the external interrupt;
    determining, in response to the calling, if data is available in a communication buffer that is intended for the user space buffer;
    if data is available,
        gaining addressability to the communication buffer and the user space buffer;
        directly copying the data from one of the communication buffer to the user space buffer and the user space buffer to the communication buffer; and
        updating a user state to indicate data has moved.

3. The method of claim 2, further comprising the steps of:
    signaling a waiting user thread to indicate that the copying of the data has occurred.

4. The method of claim 2, further comprising:
    setting at least one user runnable thread to a low priority state, wherein the at least one user runnable thread receives $1/(2^n)$ of available processor cycles, the integer $n=(1+|p1-p2|)$, wherein p1 is a hardware thread priority of the first logical processor and p2 is a hardware thread priority of the second logical processor;
    disabling network interrupts; and
    assigning the at least one user runnable thread to query a network for packet arrival.

5. A tangible computer readable medium encoded with a computer program for managing interrupts, the computer program comprising instructions for performing the steps of:
    placing at least one physical processor of the information processing system in a simultaneous multi-threading mode;

partitioning at least a first logical processor and a second logical processor associated with the at least one physical processor;

assigning the first logical processor to manage interrupts and the second logical processor to dispatch runnable user threads;

receiving an external interrupt;

changing a state of the first logical processor from a dormant state to an active state in response to an interrupt;

calling, by the first logical processor, an interrupt handler for handling the external interrupt;

determining, in response to the calling, if at least one blocked user thread exists in a waiting queue, wherein the at least one blocked user thread can become runnable as a result of the interrupt;

if the at least one blocked user thread exists in the waiting queue, setting a machine state save area associated with the first logical processor to a save area associated with the at least one blocked user thread; and directly executing an instruction stream of the previously blocked user thread on the first logical processor.

* * * * *